W. D. JOHNSTON.
Improvement in Wagon-Brakes.
No. 128,545.　　　　　　　　　　　　　　Patented July 2, 1872.
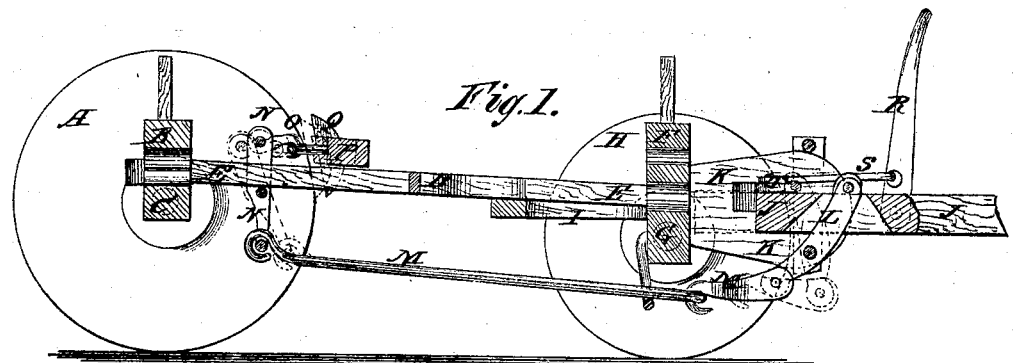
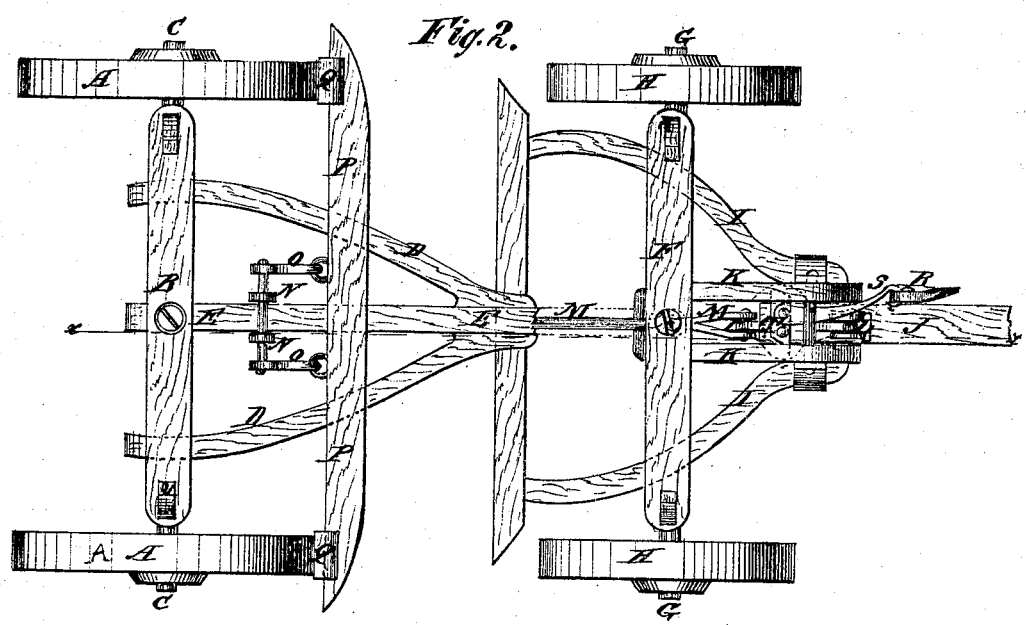
Witnesses:
P. C. Dieterich
W. A. Graham
Inventor:
William D. Johnston
per Munn & Co
Attorneys.

128,545

UNITED STATES PATENT OFFICE.

WILLIAM D. JOHNSTON, OF HARRISVILLE, PENNSYLVANIA.

IMPROVEMENT IN WAGON-BRAKES.

Specification forming part of Letters Patent No. 128,545, dated July 2, 1872.

Specification describing a new and useful Improvement in Wagon-Brake, invented by WILLIAM D. JOHNSTON, of Harrisville, in the county of Butler and State of Pennsylvania.

Figure 1 is a vertical longitudinal section of the running gear of a wagon to which my improved brake has been applied. Fig. 2 is a top view of the same, part being broken away to show the construction.

Similar letters of reference indicate corresponding parts.

My invention consists in the arrangement of a locking mechanism with the brake and tongue of a vehicle, as and for the purpose hereinafter specified.

A are the rear wheels; B, the rear bolster; C, the rear axle; D, the rear hounds; E, the reach; F, the forward bolster; G, the forward axle; H, the forward wheels; and I, the forward hounds; about the construction of which parts there is nothing new. J is the tongue, the rear end of which is inserted between the parallel vertical plates K, which are secured to and between the forward ends of the forward hounds I, and the rear ends of which are secured to the forward axle G. The plates K are designed to cause the rear end of the tongue J to move up and down in a vertical plane and to prevent all side movement of the tongue, so that the wagon may be accurately guided and controlled by the said tongue. L is a lever, the upper end of which passes up through a slot in the rear end of the tongue J, and the upper end of which is pivoted to the said tongue at its upper side so as to support the tongue and confine it between the plates K. The lever L is pivoted to the lower forward part of the plates K by a bolt which passes through the said lever and plates. To the lower end of the lever L is pivoted the forward end of a rod, M, which is jointed at or near the forward axle G, and which is held up by a keeper attached to said axle to keep it from dropping down too far. The rod M passes back beneath the reach E nearly to the rear axle C, and its rear end is pivoted to the lower end of the bars or levers N. The rod M should be made with an extension or slide, so that it may be lengthened and shortened according to the adjustment of the reach E. The levers N pass up upon each side of the reach E, and are pivoted to said reach at its lower side. To the upper ends of the levers N are pivoted the rear ends of the short rods or bars O, the forward ends of which are pivoted to the brake-bar P, to the ends of which the brake-shoes Q are attached. The brake-bar P rests upon the hounds D and reach E, and is kept in proper relative position by a keeper in the ordinary manner.

By this construction, as the wagon, in going down hill, presses forward, the resistance of the tongue operates the levers and connecting-rods and applies the brake with a power proportioned to the force with which the wagon presses forward.

R is an upwardly-projecting lever, the lower end of which is pivoted to the side of the tongue J a little in front of the forward ends of the plates K. To the lever R is pivoted the forward end of the rod S, which extends back along the tongue J, and its rear end is pivoted to the short bar or button T pivoted to the rear end of the tongue J, so that by pushing the upper or free end of the lever R forward the button T will be turned across the tongue J, its ends entering recesses in the inner side of the plates K, locking the tongue in place, and allowing the wagon to be backed without applying the brake.

Having thus described my invention, I claim as new and desire to secure by Letters Patent—

The combination of the lever R, rod S, and button T with the tongue J, cheeks K, lever L, rod M, lever N, rod O, and brake Q, all arranged and operating as shown and described.

WILLIAM D. JOHNSTON.

Witnesses:
  JAMES KERR,
  JAMES N. CUBBISON.